United States Patent [19]

Yoshida

[11] 4,439,867

[45] Mar. 27, 1984

[54] X-RAY PHOTOGRAPH UNIT

[76] Inventor: Minoru Yoshida, Tokorzawa-Kooporasu-G 308, No. 876-3, Kitaakitsu, Tokorozawa-shi, Saitama, Japan

[21] Appl. No.: 410,426

[22] Filed: Aug. 23, 1982

Related U.S. Application Data

[63] Continuation of Ser. No. 156,394, Jun. 4, 1980.

[51] Int. Cl.³ .............................................. G03B 41/16

[52] U.S. Cl. ........................................ 378/96; 378/116

[58] Field of Search .................. 378/116, 96, 115, 117

[56] References Cited

U.S. PATENT DOCUMENTS 4,097,741 6/1978 Pfeiler ................................ 378/116

4,160,906 7/1979 Daniels ............................... 378/116

*Primary Examiner*—Craig E. Church

*Attorney, Agent, or Firm*—Carroll F. Palmer

[57] ABSTRACT

In an X-ray photograph unit of the type which controls an X-ray projection on the basis of a tube voltage, a tube current and an exposure time, this invention relates to an X-ray photograph unit including photograph portion switches disposed so as to correspond to portions of the human body to be photographed and which set primarily and automatically the tube voltage and the tube current, and thickness switches disposed so as to correspond to the thickness of the portions to be photographed and setting automatically the exposure time in combination with said photograph portion switches, wherein the selection of said photograph portion switches and said thickness switches along makes it possible to carry out the X-ray projection.

6 Claims, 4 Drawing Figures

X-RAY PHOTOGRAPH UNIT

This is a continuation of application Ser. No. 156,394, filed June 4, 1980.

BACKGROUND OF THE INVENTION

This invention relates to an X-ray photograph unit which simplifies photograph control procedures.

In an X-ray photograph unit, a tube voltage and tube current of the X-ray tube and the exposure time must be suitably set in accordance with an object to be photographed.

Heretofore, the X-ray photograph unit has been set to the optimum photographing conditions and actuated by operating a tube voltage regulator, a tube current regulator and an exposure time adjuster (hereinafter called "timer") with reference to a photograph table which exclusively illustrates the conditions for the X-ray photograph for the portion to be photographed such as the tube voltage and tube current of the X-ray tube and the exposure time.

In other words, the optimum photographing conditions must be selected by sorting out the three kinds of factors on the photograph table. This procedure is not only time-consuming but also involves a high possibility of selecting the wrong conditions. In the latter case, the photograph itself must be taken again and this is extremely undesirable in the aspect of the exposure of the subject to the radioactive rays.

In the conventional X-ray photograph unit, the X-ray projection time is controlled by means of the timer. If the timer gets out of order, therefore, it sometimes happens that the X-ray irradiation does not stop, thus leading to a remarkable increase in the dose of exposure of the subject to the X-rays and hence, is extremely undesirable from the viewpoint of medical safety. As for the X-ray photograph unit, on the other hand, the X-rays are continuously irradiated in such a case, though the photograph must be originally taken within a short period of time under the rated state. Accordingly, the X-ray tube becomes overloaded and overheated and is eventually damaged and broken.

The present invention is directed to provide an X-ray photograph unit which eliminates the abovementioned drawbacks of the prior art, enables to simplify and accurately carry out the photograph control procedures and prevents the continuation of the X-ray irradiation at the time of accident.

SUMMARY OF THE INVENTION

In accordance with the present invention, there is provided an X-ray photograph unit including photograph portion switches disposed so as to correspond to portions of the human body to be photographed and which set primarily and automatically the tube voltage and the tube current, and thickness switches disposed so as to correspond to the thickness of the portions to be photographed in combination with said photograph portion switches, wherein the selection of said photograph portion switches and said thickness switches alone makes it possible to carry out the X-ray projection without using a photograph table.

Furthermore, in accordance with the present invention, protective timers for providing the upper limits of the exposure time for the portions to be photographed are controlled by means of the above-said portion switches.

DESCRIPTION OF THE PREFERRED EMBODIMENTS

Hereinafter, an embodiment of the present invention will be explained by referring to the accompanying drawings.

Figure 1:
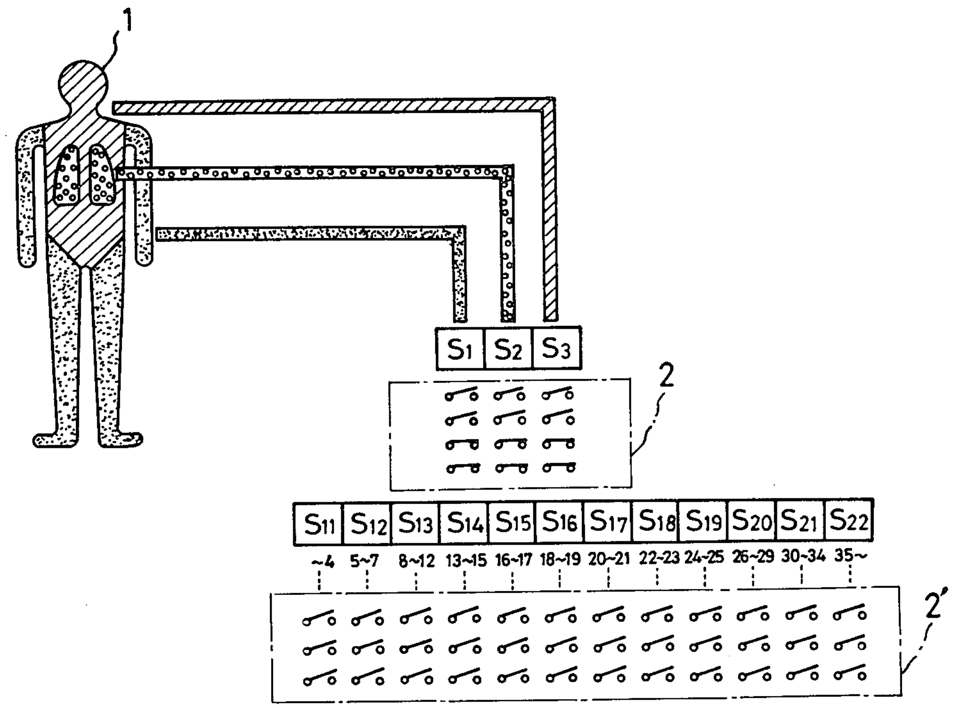
FIG. 1 shows the operation board of an embodiment of the X-ray photograph unit in accordance with the present invention.

FIG. 1 shows an operation board of the X-ray photograph unit in accordance with the present invention. The illustration 1 depicting the human body is divided into three portions, e.g., the limbs, the chest and the head-and-trunk, and these portions are designated by three different shadings. The limbs, the chest abd the head-and-trunk correspond to portion switches $S_1$, $S_2$ and $S_3$, respectively. Thickness switches represent the thickness of portions of the subject and consist of twelve switches $S_{11}$–$S_{22}$, for example. The range of thickness of each portion is represented in the cm graduation below each thickness switch. Hence, $S_{15}$ represents 16 cm–17 cm, for example.

Figure 3:
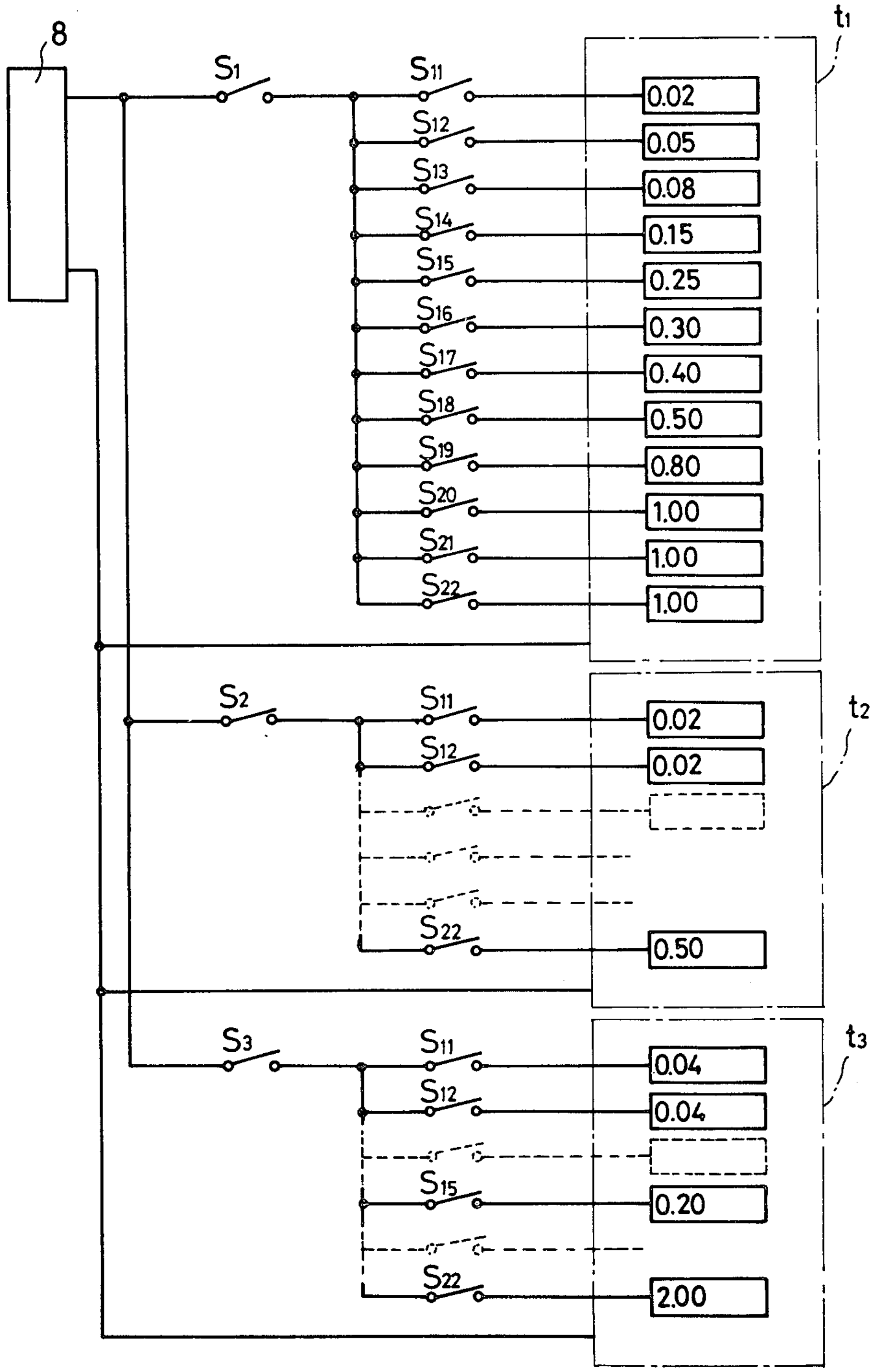
FIG. 3 is a detailed circuit diagram of the timer used in the embodiment shown in FIG. 2.
Figure 4:
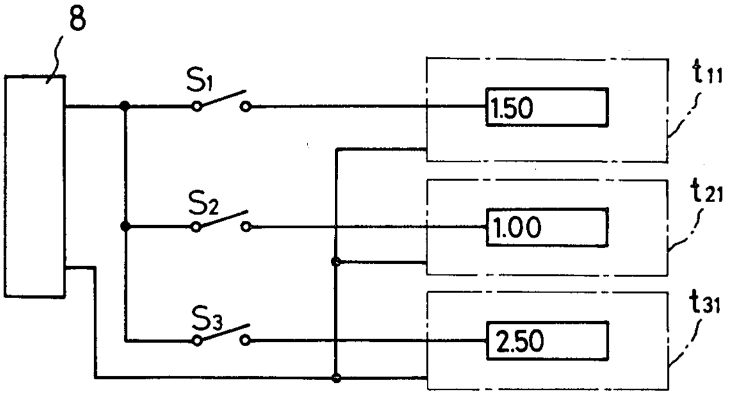
FIG. 4 is a detailed circuit diagram of the protective timer used in the embodiment shown in FIG. 2.

The portion switches $S_1$–$S_3$ and the thickness switches $S_{11}$–$S_{22}$ are of a so-called multi-throw push switch type and are so constructed that when the portion switch $S_3$ is depressed while $S_1$ is in the depressed state, for example, $S_3$ is turned ON while $S_1$ is turned OFF automatically. In other words, the switch which is finally depressed is turned ON with the others being automatically turned OFF. Auxiliary contacts for each switch are incorporated below the control board. In FIG. 1, the groups of the auxiliary contacts 2, 2' for the portion switches and the thickness switches are represented by dot-and-chain lines, respectively. The control circuit of the X-ray photograph unit in accordance with the present invention such as shown in FIGS. 2 through 4 is constructed by suitably combining the connections of these auxiliary contacts.

Figure 2:
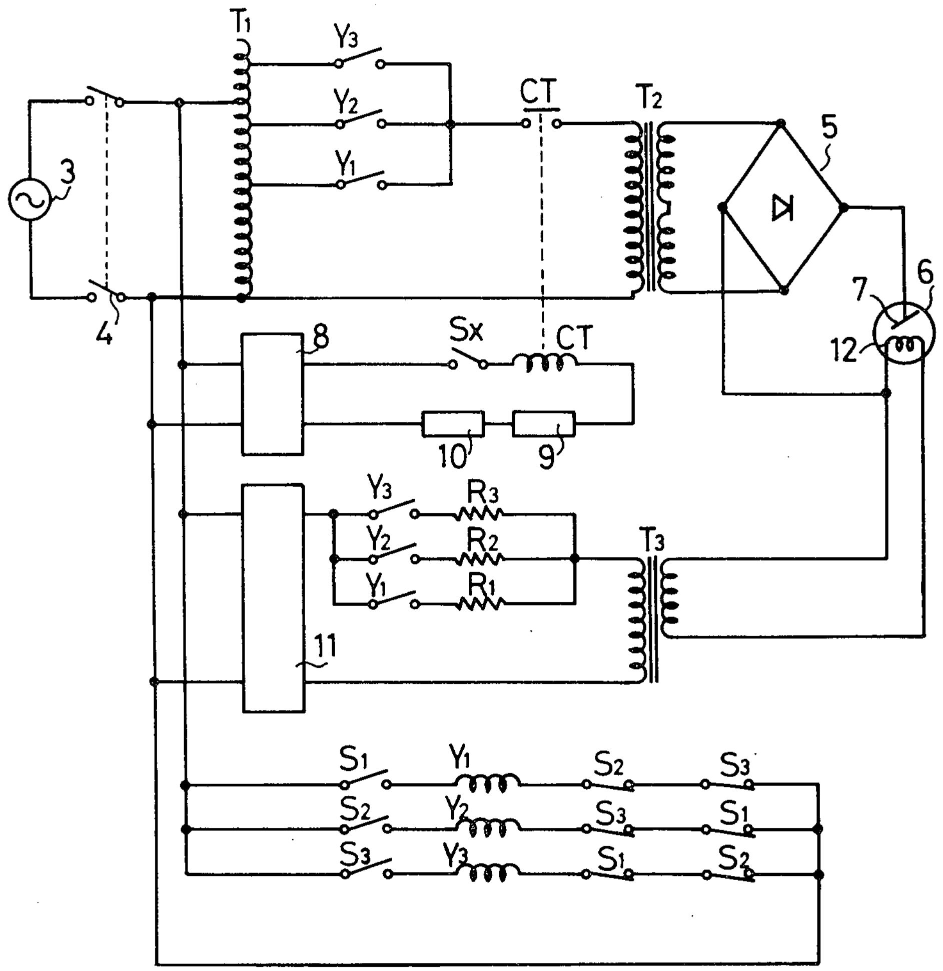
FIG. 2 is a circuit diagram of an embodiment of the present invention.

In FIG. 2, the a.c. power source 3 is connected via a power switch 4 to a series circuit consisting of a normally-open contact of the portion switch $S_1$, a coil of an auxiliary relay $Y_1$ of the portion switch $S_1$ and normally-closed contacts of the portion switches $S_2$, $S_3$, to a series circuit consisting of a normally-open contact of the portion switch $S_2$, a coil of an auxiliary relay $Y_2$ of the portion switch $S_2$ and normally-closed contacts of the portion switches $S_3$, $S_1$ and to a series circuit consisting of a normally-open contact of the portion switch $S_3$, a coil of an auxiliary relay $Y_3$ of the portion switch $S_3$ and normally-closed contacts of the portion switches $S_1$, $S_2$ whereby these three series circuits are parallel to each other. The a.c. power source 3 is also connected to an autotransformer $T_1$. Three output taps of this autotransformer $T_1$ are connected to one end of a high-voltage transformer $T_2$ on its primary side through the respective contacts of the relays $Y_3$, $Y_2$, $Y_1$ and also through a CT contact. The other end of the high-voltage transformer $T_2$ on its primary side is connected to the other output tap of the autotransformer $T_1$. The secondary side of the high-voltage transformer $T_2$ is connected via a rectification circuit 5 to the cathode and anode target 7 of the X-ray tube 6 and impresses a high voltage upon the same. When each portion switch $S_1$, $S_2$, $S_3$ is turned ON, the tube voltage is primarily and automatically determined as tabulated in Table 1.

TABLE 1

| | Tube voltage | Tube current |
|---|---|---|
| $S_1$ | 70 KV | 20 mA |
| $S_2$ | 70 KV | 50 mA |
| $S_3$ | 100 KV | 20 mA |

The power switch 4 is also connected to a d.c. constant voltage source 8. The output circuit of the d.c. constant voltage source 8 is connected to a series circuit consisting of an X-ray projective switch Sx, a CT coil, a protective timer 9 and a timer 10, and sets the X-ray projection time in combination with the portion switches and the thickness switches as will be explained later in further detail.

The power switch 4 is also connected to an a.c. constant voltage source (AVR) 11, the output of which is connected to the primary side of a filament transformer $T_3$ via three series circuits $Y_3$-$R_3$, $Y_2$-$R_2$, $Y_1$-$R_1$ consisting of the contacts of the three auxiliary relays $Y_3$, $Y_2$, $Y_1$ and three resistors $R_3$, $R_2$, $R_1$, respectively, the three series circuits being wired in parallel with one another. The secondary side of the filament transformer $T_3$ is connected to a heater filament 12. According to this circuit arrangement, the tube currents as tabulated in Table 1 are primarily and automatically determined as each portion switch is turned ON.

FIG. 3 shows the detailed circuit construction of the timer 10. The d.c. constant voltage source 8 is connected to the portion switches $S_1$, $S_2$ and $S_3$ that are in parallel with one another, and the portion switch $S_1$ is in turn connected to the thickness switches $S_{11}$–$S_{22}$ that are in parallel with one another. These thickness switches $S_{11}$–$S_{22}$ are connected to a timer set value circuit $t_1$ which has in advance determined the X-ray projection times in view of the respective portion and thickness. In the same way, timer set value circuits $t_2$ and $t_3$ are connected to the contacts of the thickness switches $S_{11}$–$S_{22}$ of the portion switches $S_2$ and $S_3$, respectively. The relationship between the timer set values versus the portion switches $S_1$–$S_3$ and thickness switches $S_{11}$–$S_{22}$ is tabulated in Table 2 below.

TABLE 2

| | $S_1$ | $S_2$ | $S_3$ | (sec) |
|---|---|---|---|---|
| $S_{11}$ (-4) | 0.02 | 0.02 | 0.04 | Timer set value |
| $S_{12}$ (5-7) | 0.05 | 0.02 | 0.04 | |
| $S_{13}$ (8-12) | 0.08 | 0.04 | 0.05 | |
| $S_{14}$ (13-15) | 0.15 | 0.04 | 0.10 | |
| $S_{15}$ (16-17) | 0.25 | 0.05 | 0.20 | |
| $S_{16}$ (18-19) | 0.30 | 0.08 | 0.30 | |
| $S_{17}$ (20-21) | 0.40 | 0.10 | 0.40 | |
| $S_{18}$ (22-23) | 0.50 | 0.12 | 0.80 | |
| $S_{19}$ (24-25) | 0.80 | 0.16 | 1.20 | |
| $S_{20}$ (26-29) | 1.00 | 0.30 | 1.50 | |
| $S_{21}$ (30-34) | 1.00 | 0.40 | 1.80 | |
| $S_{22}$ (35-) | 1.00 | 0.50 | 2.00 | |
| | 1.50 | 1.00 | 2.50 | Set value of protection timer |

FIG. 4 shows the detailed circuit of the protective timer 9. The d.c. constant voltage source 8 is connected via a parallel circuit of the portion switches $S_1$, $S_2$, $S_3$ to protective timer set value circuits $t_{11}$, $t_{21}$, $t_{31}$, respectively. The relationship between the portion switches $S_1$, $S_2$, $S_3$ and the protective timer set values is shown in Table 2. Incidentally, the timer set value circuits $t_1$–$t_3$ shown in FIG. 3 are constructed independently of those $t_{11}$–$t_{31}$ shown in FIG. 4 in order to minimize the possibility that they will simultaneously malfunction.

Next, an example of the operation of the present invention will be explained. In taking an X-ray photograph of the head, by way of example, the head portion switch $S_3$ is first turned ON, whereby the auxiliary relay $Y_3$ for the head-and-trunk portion turns ON. Since the normally-closed contacts of the portion switches $S_1$ and $S_2$ are wired in series with the portion switch $S_3$ in this instance, the autotransformer $T_1$ is prevented from being burnt out. In other words, a situation in which two of $S_1$, $S_2$ and $S_3$ are simultaneously turned ON can never occur. As the contact of the auxiliary relay $Y_3$ is turned ON, the output of the high-voltage transformer $T_2$ is set to 100 KV as illustrated in Table 1 as CT is subsequently closed. Since the contact of the auxiliary relay $Y_3$ is turned ON, further, the output voltage of the filament transformer $T_3$ passes a current of 20 mA to the filament 12 of the X-ray tube 6 in accordance with Table 1 by means of an a.c. constant voltage source (AVR) 11.

It is now assumed that the thickness of the head portion in the photographing direction is found to be 16 cm by measurement. The thickness switch $S_{15}$ corresponds to this thickness as shown in Table 2. When the thickness switch $S_{15}$ is turned ON, therefore, the portion switch $S_3$ as well as the thickness switch $S_{15}$ are turned ON in FIG. 3 so that the timer set value is automatically set to 0.20 sec.

Simultaneously, in FIG. 4, the portion switch $S_3$ is turned ON and the protective timer value is set to 2.50 sec. in accordance with Table 2. The protective timer 9 opens after the passage of a predetermined time even when the timer 10 is out of order and turns OFF the coil of CT to stop the projection of the X-rays, thereby ensuring the safety both of the patient and the X-ray unit.

It can be understood from the above explanation that the conditions are set to a tube voltage of 100 KV, a tube current of 20 mA, a timer setting of 0.20 sec. and a protective timer setting of 2.50 sec.

When the X-ray irradiation switch Sx is turned ON under these conditions, CT is closed and the X-ray tube 6 is actuated by the output of the high-voltage transformer $T_2$ and generates the X-rays. After the timer set value of 0.20 sec., the timer 10 opens whereby CT opens and the X-ray irradiation stops. If the timer is out of order, the X-ray irradiation is stopped by the protective timer after the passage of 2.50 sec.

As explained in the foregoing paragraph, it is possible in accordance with the present invention to set and actuate the X-ray tube to and in the optimum condition for X-ray photography in a simple and accurate manner by merely depressing the portion switch and the thickness switch without using the photograph table. Hence, the present invention makes it possible to simplify the operation of the X-ray photograph and to minimize erroneous operation.

What is claimed is:

1. An X-ray photograph unit of the type which controls the X-ray projection on the basis of tube voltage, tube current and exposure time which comprises:

an X-ray tube, a plurality of photography portion switches structured so as to automatically set said tube voltage and tube current to predetermined values corresponding to selected portions of the human body to be photographed, a plurality of thickness switches structured so as to set automatically the exposure time to correspond to the thickness of human body portions to be photographed in combination with said photograph portion switches, each of said photograph portion switches being connected in series with a plurality of said thickness switches and each thickness switch in turn being connected in series to first and second timers, said first timers providing an exposure time pre-determined in accordance with the human body portion to be photographed and with the thickness thereof, said second timers being protective timers to provide the upper limit of exposure time for each body portion to be photographed equivalent to an exposure time determined in accordance with the maximal thickness for each body portion to be photographed under control of said photograph portion switch, said photograph portion switches and said thickness switches being electrically connected to said X-ray tube so the selection of one of each said switches alone makes it possible to carry out an X-ray photography projection.

2. The X-ray photograph unit as defined in claim 1 wherein said first timers comprise said photograph portion switches connected in parallel to a d.c. power supply, said thickness switches connected in parallel to each of said photograph portion switches and a timer set value circuit connected to each of said thickness switches.

3. The X-ray photograph unit as defined in claim 1 wherein said second timers comprise said photograph portion switches connected in parallel to a d.c. power supply and a protective timer set value circuit connected to each of said photograph portion switches.

4. The X-ray photograph unit as defined in claim 1 wherein said photograph portion switches are connected in series to respective auxiliary relays so that when each of said photograph portion switches is turned ON, said auxiliary relay corresponding to said photograph portion switch is energized.

5. The X-ray photograph unit as defined in claim 1 wherein said application of voltage to said X-ray tube is through a high-voltage transformer that is energized by operation of one of said auxiliary relays.

6. The X-ray photograph unit of claim 3 wherein said X-ray tube is connected to said high-voltage transformer via a rectification circuit.

* * * * *